US009391448B2

(12) United States Patent
Chesnut et al.

(10) Patent No.: US 9,391,448 B2
(45) Date of Patent: Jul. 12, 2016

(54) HIGH CURRENT EVENT MITIGATION CIRCUIT

(71) Applicant: The Boeing Company, Chicago, IL (US)

(72) Inventors: Kay Chesnut, Redondo Beach, CA (US); Robert M. Martinelli, Murrieta, CA (US); Anthony C. Le, Fountain Valley, CA (US); MaryAnne Dooley, Westminster, CA (US)

(73) Assignee: The Boeing Company, Chicago, IL (US)

( * ) Notice: Subject to any disclaimer, the term of this patent is extended or adjusted under 35 U.S.C. 154(b) by 121 days.

(21) Appl. No.: 14/029,618

(22) Filed: Sep. 17, 2013

(65) Prior Publication Data

US 2015/0077084 A1    Mar. 19, 2015

(51) Int. Cl.
*H02H 3/22* (2006.01)
*H02H 9/02* (2006.01)
*H02H 5/00* (2006.01)
*H02H 9/04* (2006.01)

(52) U.S. Cl.
CPC .............. *H02H 9/02* (2013.01); *H02H 5/005* (2013.01); *H02H 9/046* (2013.01)

(58) Field of Classification Search
CPC .................................. H02H 9/04; H02M 1/32
See application file for complete search history.

(56) References Cited

U.S. PATENT DOCUMENTS 3,810,697 A * 5/1974 Steinberg ...................... 356/338
3,816,809 A   6/1974 Kuster
3,893,006 A   7/1975 Algeri et al.
4,008,418 A   2/1977 Murphy
4,090,227 A   5/1978 Schweitzer
4,202,023 A   5/1980 Sears
4,631,470 A  12/1986 Bingley
5,774,406 A * 6/1998 Kowshik ....................... 365/226
6,108,183 A   8/2000 Beene
6,548,988 B2  4/2003 Duff, Jr.
2003/0151445 A1  8/2003 Dodson
2005/0286295 A1 12/2005 Kapre et al.
2006/0221650 A1* 10/2006 Yamada ...................... 363/21.01
2010/0195258 A1  8/2010 Yang
2013/0106499 A1* 5/2013 Yamamoto .......... H01L 27/0716
                                                   327/537

FOREIGN PATENT DOCUMENTS

WO         WO 97 02837 A1    5/1987

OTHER PUBLICATIONS

Becker et al.: Latent Damage in CMOS Devices From Single-Event Latchup; IEEE Transactions on Nuclear Science, vol. 49, No. 6, Dec. 2002; (7 pgs).
Extended European Search Report for European Application No. 14183421.8 dated Dec. 5, 2014, 7 pages.

* cited by examiner

*Primary Examiner* — Thienvu Tran
*Assistant Examiner* — Tien Mai
(74) *Attorney, Agent, or Firm* — Toler Law Group, PC (57) ABSTRACT

A protection circuit includes a first resistive element configured for coupling to a protected circuit. The first resistive element has a particular resistance value. The protection circuit also includes a voltage regulator coupled to the first resistive element. The particular resistance value is selected to enable a magnitude of a bias current provided to the protected circuit to remain within a first operating current range associated with the protected circuit and to remain below a latchup holding current value associated with the protected circuit.

24 Claims, 2 Drawing Sheets

HIGH CURRENT EVENT MITIGATION CIRCUIT

GOVERNMENT INTEREST

This invention was made with Government support, awarded by the Aerospace Corporation. The government has certain rights in this invention.

FIELD OF THE DISCLOSURE

The present disclosure relates to circuits that mitigate high current events.

BACKGROUND

Integrated circuits and other semiconductor devices may be used in environments where radiation may induce a high current event. For example, an integrated circuit in outer space or in an environment exposed to nuclear radiation may experience a transient voltage spike or a transient current spike (e.g., the high current event) caused by a collision of a high energy particle, such as a high energy proton or ion associated with cosmic radiation or nuclear radiation, with the integrated circuit. When the integrated circuit includes a metal-oxide-semiconductor field-effect transistor (MOSFET) circuit, such a collision may cause the integrated circuit to "latchup" or enter a latchup state.

When the integrated circuit enters the latchup state, a low-impedance path (e.g., a short) may be created between power supply rails of the integrated circuit. The integrated circuit may transition from the latchup state to a normal operating state (e.g., the latchup state may be exited) when a magnitude of current flow through the integrated circuit no longer exceeds a latchup holding current value. If the integrated circuit remains in the latchup state for an extended time period, a latent failure may occur within the integrated circuit. A latent failure may indicate damage to the integrated circuit that does not cause an immediate error, and such damage is therefore difficult to detect. For example, a region of the integrated circuit may melt due to the current flow through the integrated circuit, but the integrated circuit may not generate a detectable error until a later time.

Some integrated circuits may use a latchup recovery circuit to detect a latchup condition and decouple the integrated circuit from one or more power supplies. After decoupling the one or more power supplies, power cycling may be performed on the one or more power supplies to reset voltage levels and to recover the integrated circuit from the latchup condition. Detecting the latchup condition and decoupling the integrated circuit from the one or more power supplies may take a time period on the order of hundreds of nanoseconds. Depending on an amount of the current flow through the integrated circuit and/or a temperature of the integrated circuit, a latent failure may occur before the integrated circuit is decoupled from the one or more power supplies. Thus, the latchup recovery circuit may not operate fast enough to prevent a latent failure from occurring within the integrated circuit. Additionally, circuit elements used to detect the latchup condition and to decouple the integrated circuit from the one or more power supplies add cost and complexity to the latchup recovery circuit.

SUMMARY

Particular embodiments disclosed herein provide a high current event mitigation circuit including a protection circuit configured to mitigate effects on a protected circuit of a high current event. The protection circuit may be coupled to the protected circuit and may be configured to provide a bias current to the protected circuit. The protection circuit may include a first resistive element coupled to a voltage regulator. A magnitude of the bias current provided to the protected circuit may be related to a first resistance value of the first resistive element. The first resistance value of the first resistive element may be selected such that the magnitude of the bias current is within an operating current range of the protected circuit during normal operation and the magnitude is below a latchup holding current value. By such a selection of the first resistance value, the protection circuit may be configured to enable the protected circuit to autonomously transition from the latchup state to a normal operating state after a high current event.

The protection circuit may further include a bypass capacitor coupled to the first resistive element and to the voltage regulator and a second resistive element coupled between the bypass capacitor and the protected circuit. The second resistive element may be configured to reduce energy provided to the protected circuit by dissipating a portion of the energy in the protection circuit without providing the portion of the energy to the protected circuit. For example, the second resistive element may dissipate the portion of the energy by converting the portion of the energy into heat. A second resistance value of the second resistive element may be selected based on a threshold energy level, a threshold temperature, a latent damage threshold latchup time period, or a combination thereof, associated with an occurrence of a latent failure within the protected circuit. By such a selection of the second resistance value, the second resistive element may be configured to dissipate sufficient energy to cause the protected circuit to exit the latchup state before the protected circuit experiences a latent failure. For example, when the protected circuit experiences a latchup event, the second resistive element may dissipate a portion of the energy provided to the protected circuit sufficient to enable the protected circuit to exit the latchup state before the protected circuit experiences a latent failure.

By providing the bias current having the magnitude below the latchup holding current value to the protected circuit, the protection circuit may enable the protected circuit to autonomously exit the latchup state after the high current event. Thus, cost and complexity of the protection circuit may be reduced as compared to a latchup recovery circuit that detects a high current level and decouples an integrated circuit from one or more power supplies to recover from the latchup state. Further, by dissipating sufficient energy in the protection circuit, the protection circuit may cause the protected circuit to exit the latchup state before the protected circuit experiences a latent failure. Thus, an integrated circuit or other semiconductor device that is subject to latchup may be used in circumstances in which high current events may occur.

In a particular embodiment, a protection circuit includes a first resistive element configured for coupling to a protected circuit. The first resistive element has a particular resistance value. The protection circuit also includes a voltage regulator coupled to the first resistive element. The particular resistance value is selected to enable a magnitude of a bias current provided to the protected circuit to remain within a first operating current range associated with the protected circuit and to remain below a latchup holding current value associated with the protected circuit.

In another particular embodiment, a circuit includes a protected circuit. The circuit also includes a protection circuit coupled to the protected circuit. The protection circuit includes a first resistive element. The protection circuit also includes a voltage regulator coupled to the first resistive element. The protection circuit includes a bypass capacitor coupled to the voltage regulator and to the first resistive element. The protection circuit further includes a second resistive element coupled between the bypass capacitor and the protected circuit.

In another particular embodiment, a method includes providing a bias current to a protected circuit. The bias current is provided by a protection circuit coupled to the protected circuit. The method also includes dissipating energy in the protection circuit during a high current event that causes the protected circuit to enter a latchup state. The protection circuit dissipates sufficient energy to enable the protected circuit to autonomously exit the latchup state.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

Figure 1:
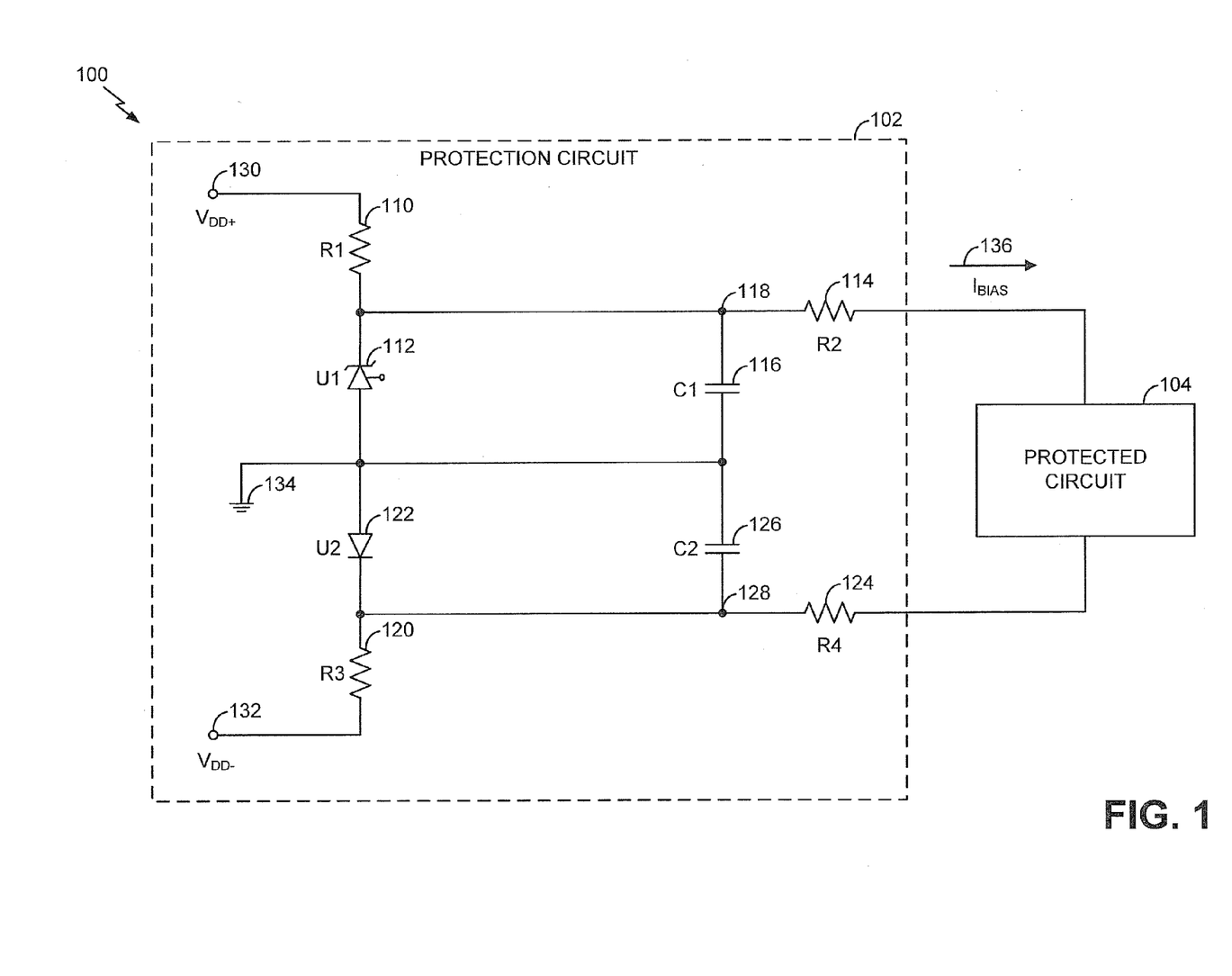
FIG. 1 is a diagram that illustrates a particular embodiment of a high current event mitigation circuit.

FIG. 1 is a diagram illustrating a particular embodiment of a high current event mitigation circuit, generally designated 100. As used herein, a high current event refers to any event that induces a transient current having a magnitude sufficient to cause damage to a protected circuit 104. For example, when the protection circuit 102 includes a bypass capacitor, such as a first bypass capacitor 116 (C1), the high current event may be an event that induces a transient current having a particular magnitude that is sufficient to cause a discharge of the first bypass capacitor 116 (C1). Examples of high current events may include electrostatic discharge (ESD), collisions with charged particles, or other events causing transient currents in the protected circuit 104. The high current event mitigation circuit 100 may be included within a platform, such as an aircraft (e.g., a fixed wing aircraft or a rotary wing aircraft), a satellite, a spacecraft, a land craft or watercraft, or another substantially self-contained structure or platform configured for use in an environment that is subject to high current events caused by a collision of one or more charged particles with the protected circuit 104 of the high current event mitigation circuit 100. For example, the high current event mitigation circuit 100 may be configured for use in an environment subject to collisions with charged particles associated with radiation, such as cosmic radiation or nuclear radiation.

The high current event mitigation circuit 100 may include the protection circuit 102 coupled to the protected circuit 104. The protected circuit 104 may include a particular integrated circuit or semiconductor device, or a portion of an integrated circuit or semiconductor device, that is subject to latchup during a high current event. For example, the protected circuit 104 may include an operational amplifier (op-amp) that is subject to latchup during the high current event. The protection circuit 102 may provide protection in addition to or instead of conventional electrostatic discharge (ESD) protection. For example, an ESD circuit coupled to a power supply may mitigate effects of a transient voltage spike from the power supply, but the ESD circuit may not mitigate effects of a high current event caused by a collision between a charged particle and a surface of the protected circuit 104. The protection circuit 102 may be configured to mitigate the effects of the high current event caused by such collisions. For example, the protection circuit 102 may be internal to the protected circuit 104 or may be disposed downstream from the one or more power supplies and the corresponding ESD circuit.

During the high current event, a collision between the charged particle and the protected circuit 104 may induce a transient high current in the protected circuit 104. When the transient high current exceeds a threshold current value, the protected circuit 104 may enter a latchup state. For example, the transient high current may cause a low impedance path (e.g., a short) to be formed between power rails of the op-amp, and the transient high current may flow between the power rails. After the transient high current dissipates, the protected circuit 104 (e.g., the op-amp) may remain in the latchup state as long as a magnitude of the current flow through the protected circuit 104 exceeds a latchup holding current value. After the transient high current dissipates, the magnitude of the current flow through the protected circuit 104 may decrease to a magnitude of a current provided to the protected circuit 104, such as a bias current. In a case where the latchup holding current value is less than the threshold current value, the protected circuit 104 remains in the latchup state while the magnitude of the current provided to the protected circuit 104 is between the threshold current value and the latchup holding current value.

The protection circuit 102 may be configured to mitigate effects of the high current event on the protected circuit 104 by providing a bias current 136 ($I_{BIAS}$) to the protected circuit 104 that enables the protected circuit 104 to autonomously transition from the latchup state to a normal operating state (e.g., autonomously exit the latchup state). For example, the high current event may be caused by a collision of a charged particle with the protected circuit 104 that induces the transient high current in the protected circuit 104. The protection circuit 102 may be configured to maintain the magnitude of the bias current 136 ($I_{BIAS}$) below the latchup holding current value and within an operating current range of the protected circuit 104. As further described herein, appropriate selection of one or more electrical characteristics of one or more circuit elements of the protection circuit 102 may enable the protection circuit 102 to provide the bias current 136 ($I_{BIAS}$) having a magnitude that does not exceed the latchup holding current value.

In a circuit that does not include the protection circuit 102, a high current event may cause a magnitude of a bias current provided to an unprotected circuit to exceed the latchup holding current value after the high current event ends (e.g., after the transient high current dissipates) until a power supply is decoupled or until power cycling is performed. However, because the magnitude of the bias current 136 ($I_{BIAS}$) received by the protected circuit 104 does not exceed the latchup holding current value, the current flow through the protected circuit 104 falls below the latchup holding current value after the transient high current dissipates. Thus, the protected circuit 104 may autonomously exit the latchup state after the high current event ends (e.g., after the transient high current dissipates) without being decoupled from one or more power supplies and without performing power cycling on the one or more power supplies to reduce the current flow through the protected circuit 104. For example, the protected circuit 104 may remain coupled to one or more power supplies during a transition of the protected circuit 104 from the latchup state to the normal operating state. The one or more power supplies may not be reset or power cycled during the entirety of the high current event. The protection circuit 102 may be a passive circuit. For example, the protection circuit 102 may not include a transistor or a switch configured to actively control the magnitude of the bias current 136 ($I_{BIAS}$). As another example, the protection circuit 102 may not include circuitry to sense a current level or a voltage level. Thus, the protection circuit 102 may enable the protected circuit to autonomously exit the latchup state without performing any active operation, such as sensing or decoupling. Additionally, the protection circuit 102 may mitigate an effect of the high current event on the protected circuit 104 without providing an additional path to ground (e.g., a shunt) during the high current event, such as in a conventional ESD circuit. Because the protection circuit 102 is a passive circuit, the protection circuit 102 may have reduced complexity and may be smaller (e.g., use less chip area) as compared to an active latchup recovery circuit. Circuits for use in environments subject to collisions with charged particles may have size (e.g., chip area) restrictions that the active latchup recovery circuit exceeds. However, the protection circuit 102 may be used in such circuits due to the reduced chip area. Thus, the protection circuit 102 may be a passive, switchless circuit that enables the protected circuit 104 to autonomously exit the latchup state caused by a collision with a charged particle.

Additionally, the protection circuit 102 may cause the protected circuit 104 to exit the latchup state before the protected circuit 104 experiences a latent failure. The protection circuit 102 may reduce energy provided to the protected circuit 104 by dissipating a portion of the energy without providing the portion of the energy to the protected circuit 104. For example, the protection circuit 102 may dissipate the portion of the energy in the protection circuit 102 by converting the portion of the energy into heat. By reducing the energy provided to the protected circuit 104, the protection circuit 102 may cause the protected circuit 104 to exit the latchup state before experiencing a latent failure, such as melting of metal lines or migration of dopants between regions of the protected circuit 104 during the high current event.

The protection circuit 102 may include resistive elements 110 (R1), 114 (R2), 120 (R3), and 124 (R4), voltage regulators 112 (U1) and 122 (U2), bypass capacitors 116 (C1) and 126 (C2), and power supply rails 130 ($V_{DD+}$) and 132 ($V_{DD-}$). A first portion of the protection circuit 102 may include a first resistive element 110 (R1) coupled between a positive power supply rail 130 ($V_{DD+}$) and a first node 118, a first voltage regulator 112 (U1) coupled between ground 134 and the first node 118, a first bypass capacitor 116 (C1) coupled between ground 134 and the first node 118, and a second resistive element 114 (R2) coupled between the first node 118 and the protected circuit 104 (e.g., coupled between the first bypass capacitor 116 (C1) and the protected circuit 104). A second portion of the protection circuit 102 may include a third resistive element 120 (R3) coupled between a negative power supply rail 132 ($V_{DD}$) and a second node 128, a second voltage regulator 122 (U2) coupled between ground 134 and the second node 128, a second bypass capacitor 126 (C2) coupled between ground 134 and the second node 128, and a fourth resistive element 124 (R4) coupled between the second node 128 and the protected circuit 104 (e.g., coupled between the second bypass capacitor 126 (C2) and the protected circuit 104).

When powered by the positive power supply rail 130 ($V_{DD+}$) and by the negative power supply rail 132 ($V_{DD}$), the protection circuit 102 may provide the bias current 136 ($I_{BIAS}$) to the protected circuit 104. For example, the positive power supply rail 130 ($V_{DD+}$) and the negative power supply rail 132 ($V_{DD}$) may be coupled to a positive power supply and to a negative power supply, respectively, such that the bias current 136 ($I_{BIAS}$) flows through the protection circuit 102 and to the protected circuit 104.

The magnitude of the bias current 136 ($I_{BIAS}$) may be related to the first resistive element 110 (R1) and the second resistive element 114 (R2). The first resistive element 110 (R1) may include any circuit element that provides a selected resistance in the protection circuit 102. For example, the first resistive element 110 (R1) may include a resistor. As another example, the first resistive element 110 (R1) may be a current source configured to generate the bias current 136 ($I_{BIAS}$). The second resistive element 114 (R2) may include any circuit element, such as a resistor, that dissipates energy within the protection circuit 102. A switching noise associated with the bias current 136 ($I_{BIAS}$) may be reduced by use of the first bypass capacitor 116 (C1). For example, the first bypass capacitor 116 (C1) may be configured to reduce the switching noise to within a switching noise tolerance of the protected circuit 104.

A voltage level at the first node 118 may be substantially constant across varying temperatures. For example, the first voltage regulator 112 (U1) may be configured to enable the voltage level at the first node 118 to be substantially temperature independent. The first voltage regulator 112 (U1) may include any device capable of sustaining the voltage level at the first node 118 across the varying temperatures. For example, the first voltage regulator 112 (U1) may include a diode, such as a Zener diode, that provides a substantially constant, temperature-independent voltage across a wide temperature range. Thus, a bias voltage provided to the protected circuit 104 may be substantially constant across the varying temperatures.

Receiving the bias current 136 ($I_{BIAS}$) and the bias voltage may enable the protected circuit to perform one or more functions in a normal operating state. For example, when the protected circuit 104 is an op-amp and is in the normal operating state, the op-amp may compare two input voltages. However, during a high current event, the protected circuit 104 may transition from the normal operating state into the latchup state. The high current event may induce a transient high current through the protected circuit 104 (e.g., between power rails of the op-amp). While in the latchup state, the protected circuit 104 (e.g., the op-amp) may incorrectly compare the two input voltages. The protection circuit 102 may be configured to mitigate the effects of the high current event on the protected circuit 104. For example, the protection circuit 102 may be configured to enable the protected circuit 104 to autonomously transition from the latchup state to the normal operating state by maintaining the magnitude of the bias current 136 ($I_{BIAS}$) provided to the protected circuit 104 below the latchup holding current value. The magnitude of the bias current 136 ($I_{BIAS}$) may be determined based on one or more electrical characteristics of the protection circuit 102.

To mitigate the effects of the high current event on the protected circuit 104, the protection circuit 102 may be designed (e.g., the one or more electrical characteristics of the protection circuit 102 may be selected) based on one or more electrical characteristics of the protected circuit 104. The one or more electrical characteristics of the protected circuit 104 may be determined by analysis of the protected circuit 104, empirical data associated with the protected circuit 104, or a combination thereof. The one or more electrical characteristics may be determined by studying a simulated high current event on a test circuit that is the same as (or similar to) the protected circuit 104. For example, a laser may be used to simulate a high current event in the test circuit (the test circuit may include the same type of op-amp as the protected circuit 104). During the simulated high current event, the test circuit may be studied and measurements, such as a current level, a voltage level, a temperature, an energy level, or a combination thereof, may be taken using one or more tools, such as an oscilloscope. The measurements may be used to determine the one or more electrical characteristics of the test circuit that correspond to one or more characteristics of the protected circuit 104. For example, the latchup holding current value and the threshold current value may be determined based on measurements that indicate when the test circuit enters the latchup state (e.g., when the current flow through the test circuit increases). The simulated high current event may induce a transient high current that causes a latent failure within the test circuit. A threshold energy level, a threshold temperature, a latent damage threshold latchup time period, or a combination thereof, may be determined based on measurements of a voltage, a current, an energy level, a temperature, a length of time between application of the simulated high current event to the test circuit and an occurrence of the latent failure, or a combination thereof, of the test circuit when the latent failure occurs.

The protection circuit 102 may be designed based on the one or more electrical characteristics of the protected circuit 104 to enable the protection circuit 102 to mitigate the effects of the high current event on the protected circuit 104. During a design process of the protection circuit 102, one or more circuit elements of the protection circuit 102 may be selected based on the one or more electrical characteristics of the protected circuit 104. For example, a first resistance value of the first resistive element 110 (R1) may be selected based on the operating current range and the latchup holding current value of the protected circuit 104, as further described herein. A particular resistive element having the first resistance may be included in the protection circuit 102 based on the selection. Other electrical characteristics of other circuit elements may be similarly selected during the design process.

The first resistance value may be selected based on the operating current range associated with the protected circuit 104 and based on a latchup holding current value associated with the protected circuit 104. The first resistance value may be selected to enable the magnitude of the bias current 136 ($I_{BIAS}$) to not exceed a particular value (e.g., to be within a particular range) regardless of whether the protected circuit 104 is in the normal operating state or the latchup state. For example, the first resistance value of the first resistive element 110 (R1) may be selected to be high enough that the magnitude of the bias current 136 ($I_{BIAS}$) is below the latchup holding current value and low enough that the magnitude of the bias current 136 ($I_{BIAS}$) is within the operating current range associated with the protected circuit 104. In a particular embodiment, the first resistance value of the first resistive element 110 (R1) may be greater than or equal to two kilo-ohms. For example, when the protection circuit 102 is powered by a positive 13 volt power source and a negative 13 volt power source, a minimum operating current of the protected circuit 104 is 5 milliamps (mA), and the latchup holding current value is 10 mA, the first resistance value may be approximately 2.5 kilo-ohms. In this case, use of an approximately 2.5 kilo-ohm resistor as the first resistive element 110 (R1) may cause the magnitude of the bias current 136 ($I_{BIAS}$) to be above 5 mA (e.g., within the operating current range of the protected circuit 104) and to be below 10 mA (e.g., the latchup holding current value). The first resistance value of the first resistive element 110 (R1) may be further selected based on a different operating current range associated with the first voltage regulator 112 (U1). For example, the first resistance value may be appropriately selected to enable the magnitude of the bias current 136 ($I_{BIAS}$) to be within the operating current range of the protected circuit 104, to be within the different operating current range of the first voltage regulator 112 (U1), and to be below the latchup holding current value. When the magnitude of the bias current 136 ($I_{BIAS}$) is within the different operating current range, the first voltage regulator 112 (U1) may stay in regulation (e.g., the first voltage regulator 112 (U1) may regulate the voltage level of the first node 118). The operating range of the protected circuit 104 and the different operating range of the first voltage regulator 112 (U1) may overlap such that the magnitude of the bias current 136 ($I_{BIAS}$) may be within both ranges.

A first capacitance value of the first bypass capacitor 116 (C1) may be selected to reduce the switching noise associated with the bias current 136 ($I_{BIAS}$) and to reduce a time period that the protected circuit 104 is in the latchup state. For example, after the protected circuit 104 enters the latchup state, the energy provided to the protected circuit 104 may result from a discharge of the first bypass capacitor 116 (C1). The time period that the protected circuit 104 is in the latchup state may be based on the amount of energy provided to the protected circuit 104, which may be related to the energy discharged by the first bypass capacitor 116 (C1). For example, as additional energy is provided to the protected circuit 104, the transient high current flowing through the protected circuit 104 may remain above the latchup holding current value. A temperature of the protected circuit 104 may increase as the protected circuit 104 receives the energy (e.g., as the protected circuit 104 remains in the latchup state).

Appropriate selection of the first capacitance value of the first bypass capacitor 116 (C1) may reduce the amount of the energy provided to the protected circuit 104 and the time period the protected circuit 104 is in the latchup state. For example, the first capacitance value may be selected to be low enough to reduce the time period that the protected circuit 104 is in the latchup state and high enough to enable the switching noise to be within switching noise tolerance of the protected circuit 104. In a particular embodiment, the first capacitance value may be selected to be a minimum capacitance value that enables the switching noise to be within the switching noise tolerance of the protected circuit 104. For example, the first capacitance value may be less than or equal to 0.1 microfarads. As another example, the first capacitance value may be at least one order of magnitude less than a one microfarad bypass capacitor.

A second resistance value of the second resistive element 114 (R2) may be selected to enable the protection circuit 102 to reduce the energy provided to the protected circuit 104. Reducing the energy provided to the protected circuit 104 may enable the transient high current flowing through the protected circuit 104 to be reduced below the latchup holding current value while the protected circuit 104 is in the latchup state without decoupling one or more power supplies from the protection circuit 102. For example, the second resistive element 114 (R2) may be configured to reduce the energy provided to the protected circuit 104 by dissipating a portion of the energy from the protection circuit 102 without providing that portion (e.g., the dissipated portion) of the energy to the protected circuit 104. As explained above, energy is discharged by the first bypass capacitor 116 (C1) when the protected circuit 104 is in the latchup state, and the second resistive element 114 (R2) may dissipate a portion of the energy within the protection circuit 102 to reduce the energy provided to the protected circuit 104. For example, the second resistive element 114 (R2) may dissipate the portion of the energy in the protection circuit 102 by converting the portion of the energy into heat. However, including the second resistive element 114 (R2) between the first bypass capacitor 116 (C1) and the protected circuit 104 may increase the switching noise of the protected circuit 104. The second resistance value may be selected to be high enough to dissipate energy in the protection circuit 102 without causing the switching noise to exceed the switching noise tolerance of the protected circuit 104. In a particular embodiment, the second resistance value may be less than or equal to ten ohms. In another embodiment, the second resistance value may be approximately zero ohms (e.g., the second resistive element 114 (R2) may not be included in the protection circuit 102). The second resistance value may be further selected such that a first impedance of the second resistive element 114 (R2) is greater than a second impedance of the protected circuit 104 while the protected circuit 104 is in the latchup state.

The time period that the protected circuit is in the latchup state may be determined based on the first capacitance value of the first bypass capacitor 116 (C1) and the second resistance value of the second resistive element 114 (R2). For example, the time period may be related to the first capacitance value and to the second resistance value, and to latchup characteristics of the protected circuit 104 (e.g., the latchup holding current value or a latchup holding voltage value). The time period may also be related to the magnitude of the bias current 136 ($I_{BIAS}$) provided to the protected circuit 104. The time period may also be related to the first resistance value of the first resistive element 110 (R1). In a particular embodiment, a relationship between the time period and the first resistance value may be a second order relationship. By appropriate selection of the first capacitance value and the second resistance value (and of the first resistance value), the protection circuit 102 may be configured to reduce the energy provided to the protected circuit 104 and to prevent the time period from exceeding the latent damage threshold latchup time period. The threshold time period may be associated with a potential latent failure within the protected circuit 104. Reducing the energy provided to the protected circuit 104 may enable the protected circuit 104 to autonomously exit the latchup state before the latent damage threshold latchup time period is exceeded. Additionally, reducing the energy provided to the protected circuit 104 may prevent the energy from exceeding the threshold energy level and may prevent the temperature of the protected circuit 104 from exceeding the threshold temperature. The threshold energy level and the threshold temperature may be associated with a potential latent failure within the protected circuit 104. As explained above, the latent damage threshold latchup time period, the threshold energy level, and the threshold temperature may be determined by measuring values associated with an occurrence of a latent failure at a test circuit similar to the protected circuit 104. For example, a latent failure may occur in the test circuit when a temperature of the test circuit exceeds 400° Celsius (C). The latent failure may include movement of dopant atoms between regions in the test circuit. In this example, the first capacitance value and the second resistance value may be selected such that a temperature of the protected circuit 104 does not exceed 400° C. As another example, the latent failure may include electromigration of one or more metal lines in the test circuit when an amount of energy provided to the test circuit exceeds the threshold energy level. The threshold energy level may correspond to a threshold current density of the test circuit. In this example, the first capacitance value and the second resistance value may be selected such that an amount of energy provided to the protected circuit 104 does not exceed the threshold energy level. Thus, the first capacitance value and the second resistance value may be selected based on the latent damage threshold latchup time period, the threshold energy level, the threshold temperature, or a combination thereof. By reducing the energy provided to the protected circuit 104, the protection circuit 102 may prevent one or more the protected circuit 104 from exceeding one or more thresholds associated with a potential latent failure within the protected circuit 104.

Electrical characteristics of the second portion of the protection circuit 102, such as a third resistance value of the third resistive element 120 (R3), a fourth resistance value of the fourth resistive element 124 (R4), and a second capacitance value of the second bypass capacitor 126 (C2) may be selected in a similar manner to the first resistance value of the first resistive element 110 (R1), the second resistance value of the second resistive element 114 (R2), and the first capacitance value of the first bypass capacitor 116 (C1), respectively. However, the second portion of the protection circuit 102 may mitigate effects of a negative polarity high current event, whereas the first portion of the protection circuit 102 may mitigate a positive polarity high current event.

During operation of the high current event mitigation circuit 100, the protection circuit 102 may be coupled to one or more power sources via the power supply rails 130 and 132 to provide the bias current 136 ($I_{BIAS}$) to the protected circuit 104. The magnitude of the bias current 136 ($I_{BIAS}$) may be within the operating current range associated with the protected circuit 104 and below the latchup holding current value. During the high current event, the protected circuit 104 may enter the latchup state and a transient high current may flow through the protected circuit 104. The magnitude of the bias current 136 ($I_{BIAS}$) remains below the latchup holding current value. The protection circuit 102 may reduce the energy provided to the protected circuit 104 by dissipating a portion of energy from the protection circuit 102 without providing the dissipated portion of the energy to the protected circuit 104. By maintaining the magnitude of the bias current 136 ($I_{BIAS}$) below the latchup holding current value and by dissipating the portion of the energy in the protection circuit 102, the protection circuit 102 causes a magnitude of the current flow through the protected circuit 104 to fall below the latchup holding current value when the high current event ends. When the magnitude of the current flow through the protected circuit 104 falls below the latchup holding current value, the protected circuit 104 autonomously transitions from the latchup state to the normal operating state.

By providing the bias current 136 ($I_{BIAS}$) to the protected circuit 104 such that the bias current 136 ($I_{BIAS}$) does not exceed the latchup holding current value, the protection circuit 102 may enable the protected circuit 104 to autonomously exit a latchup state when the high current ends without decoupling the protected circuit 104. Because the protection circuit 102 is a passive circuit, the protection circuit 102 provides faster latchup recovery than an active latchup recovery circuit that senses a current level or a voltage level and decouples an integrated circuit from one or more power supplies. Additionally, the protection circuit 102 provides faster latchup recovery than an active latchup recovery circuit that uses switches to control a bias voltage or current, or that performs power cycling. Thus, the protection circuit 102 may have reduced cost and complexity as compared to an active latchup recovery circuit that senses high current levels, that decouples an integrated circuit from one or more power supplies, that performs power cycling, or that uses switches to control a bias voltage or bias current to cause the integrated circuit to exit the latchup state. The faster latchup recovery and the reduced costs and complexity may enable the protection circuit 102 to be used in environments subject to high current events caused by a collision with a charged particle, such as an environment subject to radiation. Further, by dissipating the portion of the energy in the protection circuit 102 (e.g., via the second resistive element 114 (R2)), the protection circuit 102 may prevent the protected circuit 104 from exceeding one or more thresholds associated with a potential latent failure within the protected circuit 104. Thus, by using the high current event mitigation circuit 100 that includes the protection circuit 102, an integrated circuit that is subject to latchup conditions may be included in a device configured for use in environments that are subject to high current events, such as in outer space or in an ionizing radiation environment.

Figure 2:
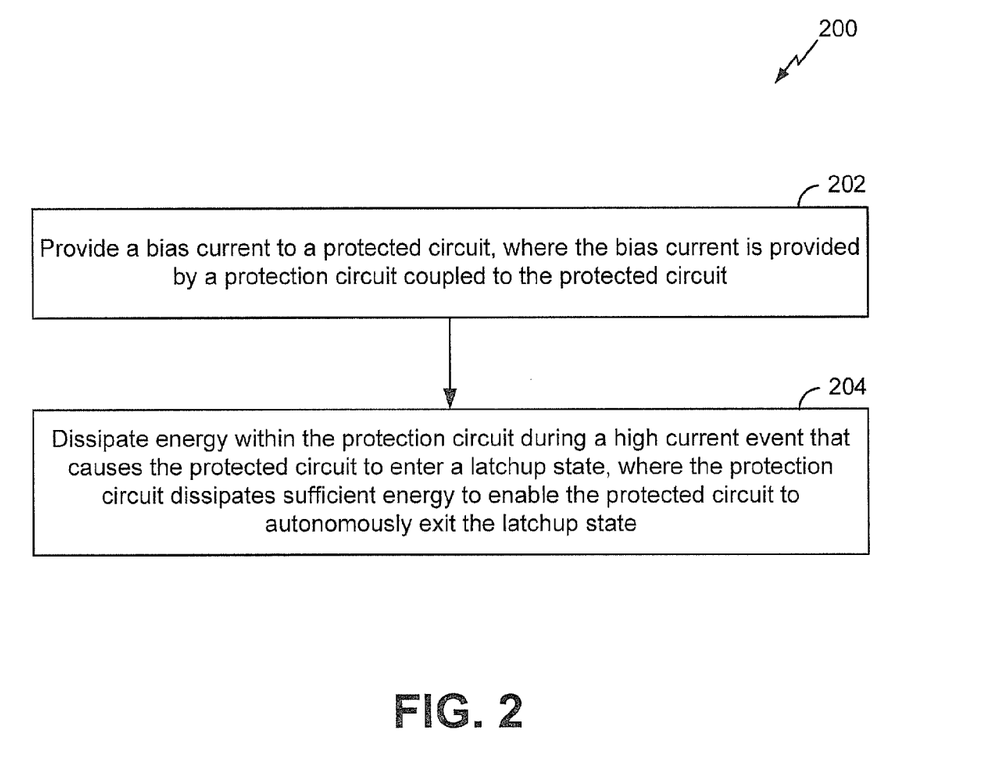
FIG. 2 is a flow diagram that illustrates a particular embodiment of a method of mitigating a high current event.

FIG. 2 is a flow chart illustrating a particular embodiment of a method 200 of mitigating a high current event. The high current event may be mitigated through use of a high current event mitigation circuit, such as the high current event mitigation circuit 100 of FIG. 1. The high current event mitigation circuit may be used in environments in which a protected circuit may be subjected to transient high current. For example, the high current event mitigation circuit may be included in devices configured for use in outer space or in an ionizing radiation environment, which may be subject to high current events caused by impact with high energy particles or ions.

The method 200 includes providing a bias current to the protected circuit, at 202. For example, the bias current may include the bias current 136 ($I_{BIAS}$) of FIG. 1, and the protected circuit may include the protected circuit 104 of FIG. 1. The bias current is provided by a protection circuit coupled to the protected circuit. For example, the protection circuit may include the protection circuit 102 of FIG. 1. The protection circuit may be a passive circuit (e.g., the protection circuit may not include an active element such as a switch or a transistor). A magnitude of the bias current may be related to a first resistance value of a first resistive element of the protection circuit and a power source voltage of the protection circuit. The first resistive element may include the first resistive element 110 (R1) of FIG. 1. The first resistance is selected to enable the protection circuit to maintain the magnitude of the bias current below a latchup holding current value associated with the protected circuit.

Energy may be dissipated within the protection circuit during a high current event, at 204. The high current event may cause the protected circuit to enter a latchup state. For example, the high current event may induce a transient high current to flow through the protected circuit, which causes the protected circuit to enter the latchup state due to the transient high current exceeding a threshold latchup current. Energy provided to the protected circuit from the protection circuit may also cause the protected circuit to enter the latchup state. The protected circuit may remain in the latchup state until the current flow through the protected circuit no longer exceeds the latchup holding current value. The protection circuit may be configured to enable the protected circuit to autonomously exit the latchup state instead of remaining in the latchup state after the high current event ends.

The protection circuit may dissipate sufficient energy to enable the protected circuit to autonomously exit the latchup state. The protected circuit may autonomously exit the latchup state when the current flow through the protected device is below the latchup holding current value. For example, when the high current event ends (e.g., dissipates), the current flow through the protected circuit may fall below the latchup holding current value (based on to the magnitude of the bias current provided to the protected circuit and the reduction of energy in the protection circuit). Thus, the protection circuit may be configured to dissipate energy so that the protected circuit does not remain in the latchup state after the high current event ends. For example, the protection circuit may include a second resistive element configured to reduce the energy provided to the protected circuit. The second resistive element may include the second resistive element 114 (R2) of FIG. 1. The second resistive element may reduce the energy provided to the protected circuit by dissipating a portion of the energy in the protection circuit without providing the portion of the energy to the protected circuit, such as by converting the portion of the energy into heat. An amount of energy dissipated in the protection circuit may be related to a second resistance value of the second resistive element. By dissipating the portion of the energy in the protection circuit and by maintaining the magnitude of the bias current below the latchup holding current value, the current flow through the protected circuit falls below the latchup holding current value after the high current event ends, and the protected circuit autonomously exits the latchup state.

Further, reducing the energy provided to the protected circuit may mitigate effects of the high current event on the protected circuit. Damage to the protected circuit, such as a latent failure, may be based on a current density of the high current event and a subsequent latchup of the protected circuit. For example, a high current event having a large current density may cause damage to the protected circuit more quickly than a high current event having a small current density. Reducing the energy provided to the protected circuit may reduce the current density associated with the protected circuit and may reduce a time period that the protected circuit is in the latchup state. For example, a latent failure may occur in the protected circuit when the energy provided to the protected circuit exceeds a threshold energy level, when a temperature of the protected circuit exceeds a threshold temperature, or when a time period the protected circuit is in the latchup state exceeds a latent damage threshold latchup time period. An amount of the energy provided to the protected circuit may be related to the second resistance value of the second restive element and to a capacitance value of a bypass capacitor of the protection circuit. The bypass capacitor may include the first bypass capacitor 116 (C1) of FIG. 1. Thus, appropriate selection of the second resistance value and the capacitance value may prevent the energy provided to the protected circuit from exceeding the threshold energy level. Appropriate selection of the second resistance value and the capacitance value may also prevent the temperature of the protected circuit from exceeding the threshold temperature and/or prevent the time period from exceeding the latent damage threshold latchup time period.

By dissipating sufficient energy in the protection circuit, the method 200 of FIG. 2 may enable the protected circuit to autonomously exit a latchup state after a high current event. For example, after the high current event ends, the protected circuit may autonomously exit the latchup state when the current flow through the protected circuit falls below the latchup current holding value due to the dissipation of energy in the protection circuit and due to the magnitude of the bias current remaining below the latchup holding current value. Additionally, by using a passive circuit to dissipate the energy, the method 200 may cause the protected circuit to autonomously exit the latchup state faster than through use of an active circuit, such as a circuit that senses a current level, that decouples a power supply from an integrated circuit, or that uses one or more switches to control a voltage or current level. Thus, the protection circuit used to perform the method 200 may have reduced cost and complexity as compared to an active latchup recovery circuit. Because of the benefits to speed and complexity, the method 200 may be used to mitigate high current events in an environment subject to collisions with charged particles. Further, by dissipating sufficient energy in the protection circuit, the method 200 may maintain a time period that the protected circuit is in the latchup state below a latent damage threshold latchup time period.

Examples described above illustrate but do not limit the disclosure. It should also be understood that numerous modifications and variations are possible in accordance with the principles of the present disclosure. Accordingly, the scope of the disclosure is defined by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

What is claimed is:

1. A protection circuit, comprising:
    a first resistive element configured for coupling to a protected circuit, wherein the first resistive element has a particular resistance value;
    a voltage regulator coupled to the first resistive element;
    a bypass capacitor coupled to the first resistive element and to the voltage regulator; and
    a second resistive element coupled to the bypass capacitor and configured for coupling between the bypass capacitor and the protected circuit,
    wherein the particular resistance value is selected to enable a magnitude of a bias current provided to the protected circuit to remain within a first operating current range associated with the protected circuit and to remain below a latchup holding current value associated with the protected circuit, and wherein a capacitance value of the bypass capacitor is less than or equal to 0.1 microfarads, and wherein a resistance value of the second resistive element is less than or equal to 10 ohms.

2. The protection circuit of claim 1, further comprising the protected circuit coupled to the first resistive element and to the voltage regulator, wherein the bias current is generated via the first resistive element and the voltage regulator.

3. The protection circuit of claim 1, wherein the voltage regulator and the first resistive element are configured to mitigate an effect of a high current event caused by a collision of a charged particle with the protected circuit.

4. The protection circuit of claim 1, wherein the magnitude of the bias current being below the latchup holding current value enables the protected circuit to autonomously transition from a latchup state to a normal operating state after a high current event.

5. The protection circuit of claim 4, wherein the protected circuit remains coupled to one or more power supplies during a transition of the protected circuit from the latchup state to the normal operating state.

6. The protection circuit of claim 1, wherein the first resistive element comprises a resistor.

7. The protection circuit of claim 1, wherein the first resistive element comprises a current source.

8. The protection circuit of claim 1, wherein the second resistive element is configured to reduce energy provided to the protected circuit during a high current event by dissipating a portion of the energy from the protection circuit without providing the portion of the energy to the protected circuit.

9. The protection circuit of claim 1, wherein the first resistive element is coupled between a power supply and a particular node, wherein the voltage regulator and the bypass capacitor are coupled between the particular node and ground, and wherein the second resistive element is coupled between the particular node and the protected circuit.

10. A circuit comprising:
    a protected circuit; and
    a protection circuit coupled to the protected circuit, wherein the protection circuit comprises:
        a first resistive element;
        a voltage regulator coupled to the first resistive element;
        a bypass capacitor coupled to the voltage regulator and to the first resistive element; and
        a second resistive element coupled between the bypass capacitor and the protected circuit, wherein the second resistive element is configured to reduce energy provided to the protected circuit during a high current event by dissipating a portion of the energy from the protection circuit without providing the portion of the energy to the protected circuit, wherein the first resistive element is coupled between a power supply and a particular node, wherein the voltage regulator and the bypass capacitor are coupled between the articular node and ground, and wherein the second resistive element is coupled between the particular node and the protected circuit.

11. The circuit of claim 10, wherein the bypass capacitor is coupled to the protected circuit.

12. The circuit of claim 10, wherein a particular resistance value of the second resistive element is selected to enable the protected circuit to transition from a latchup state to a normal operating state without decoupling the power supply from the protection circuit.

13. The circuit of claim 10, wherein a particular resistance value of the second resistive element is selected based on a threshold energy level, a threshold temperature, a latent damage threshold latchup time period, or a combination thereof.

14. The circuit of claim 13, wherein a capacitance value of the bypass capacitor is selected based on the threshold energy level, the threshold temperature, the latent damage threshold latchup time period, or a combination thereof, and based on a switching noise tolerance of the protected circuit.

15. The circuit of claim 10, wherein the second resistive element and the bypass capacitor are configured to prevent energy provided to the protected circuit during the high current event from reaching a threshold energy level, and wherein the threshold energy level is associated with a potential latent failure within the protected circuit.

16. The circuit of claim 10, wherein a capacitance value of the bypass capacitor is less than or equal to 0.1 microfarads, and wherein a resistance value of the second resistive element is less than or equal to 10 ohms.

17. A method comprising:
providing a bias current to a protected circuit, wherein the bias current is provided by a protection circuit coupled to the protected circuit; and
dissipating energy in the protection circuit during a high current event that causes the protected circuit to enter a latchup state, wherein the protection circuit dissipates sufficient energy to enable the protected circuit to autonomously exit the latchup state, wherein dissipating the energy in the protection circuit maintains a temperature of the protected circuit below a threshold temperature during the high current event, and wherein the protection circuit is configured to mitigate an effect of the high current event caused by a collision of a charged particle with the protected circuit.

18. The method of claim 17, wherein the protected circuit exits from the latchup state to a normal operating state without decoupling a power supply coupled to the protection circuit.

19. The method of claim 17, wherein dissipating the energy in the protection circuit maintains a time period the protected circuit is in the latchup state below a latent damage threshold latchup time period.

20. The method of claim 19, wherein the protection circuit comprises a bypass capacitor and a resistive element coupled between the bypass capacitor and the protected circuit, and wherein the time period is based on a resistance of the resistive element and a capacitance of the bypass capacitor.

21. A protection circuit, comprising:
a first resistive element configured for coupling to a protected circuit, wherein the first resistive element has a particular resistance value; and
a voltage regulator coupled to the first resistive element, wherein the particular resistance value is selected to enable a magnitude of a bias current provided to the protected circuit to remain within a first operating current range associated with the protected circuit and to remain below a latchup holding current value associated with the protected circuit, and wherein the voltage regulator and the first resistive element are configured to mitigate an effect of a high current event caused by a collision of a charged particle with the protected circuit.

22. A circuit comprising:
a protected circuit; and
a protection circuit coupled to the protected circuit, wherein the protection circuit comprises:
a first resistive element;
a voltage regulator coupled to the first resistive element;
a bypass capacitor coupled to the voltage regulator and to the first resistive element; and
a second resistive element coupled between the bypass capacitor and the protected circuit, wherein a particular resistance value of the second resistive element is selected to enable the protected circuit to transition from a latchup state to a normal operating state without decoupling a power supply coupled to the protection circuit, wherein a capacitance value of the bypass capacitor is less than or equal to 0.1 microfarads, and wherein the particular resistance value of the second resistive element is less than or equal to 10 ohms.

23. A circuit comprising:
a protected circuit; and
a protection circuit coupled to the protected circuit, wherein the protection circuit comprises:
a first resistive element;
a voltage regulator coupled to the first resistive element;
a bypass capacitor coupled to the voltage regulator and to the first resistive element; and
a second resistive element coupled between the bypass capacitor and the protected circuit, wherein a particular resistance value of the second resistive element is selected based on a threshold energy level, a threshold temperature, a latent damage threshold latchup time period, or a combination thereof, and wherein the voltage regulator and the first resistive element are configured to mitigate an effect of a high current event caused by a collision of a charged particle with the protected circuit.

24. A protection circuit comprising:
a first resistive element;
a voltage regulator coupled to the first resistive element;
a bypass capacitor coupled to the voltage regulator and to the first resistive element; and
a second resistive element coupled between the bypass capacitor and a protected circuit, wherein the second resistive element and the bypass capacitor are configured to prevent energy provided to the protected circuit during a high current event from reaching a threshold energy level, wherein the threshold energy level is associated with a potential latent failure within the protected circuit, wherein the first resistive element is coupled between a power supply and a particular node, wherein the voltage regulator and the bypass capacitor are coupled between the particular node and ground, and wherein the second resistive element is coupled between the particular node and the protected circuit.

* * * * *